United States Patent
Black et al.

(10) Patent No.: US 10,802,787 B2
(45) Date of Patent: Oct. 13, 2020

(54) INTEGRATING AUDIENCE PARTICIPATION CONTENT INTO VIRTUAL REALITY CONTENT

(71) Applicant: Sony Interactive Entertainment Inc., Tokyo (JP)

(72) Inventors: Glenn T. Black, San Mateo, CA (US); Michael G. Taylor, San Mateo, CA (US); Todd Tokubo, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/472,226

(22) Filed: Mar. 28, 2017

(65) Prior Publication Data
US 2018/0095708 A1    Apr. 5, 2018

Related U.S. Application Data

(60) Provisional application No. 62/403,025, filed on Sep. 30, 2016.

(51) Int. Cl.
| | | |
|---|---|---|
| *G06F 3/147* | (2006.01) | |
| *A63F 13/211* | (2014.01) | |
| *A63F 13/5255* | (2014.01) | |
| *A63F 13/26* | (2014.01) | |

(Continued)

(52) U.S. Cl.
CPC ............ *G06F 3/147* (2013.01); *A63F 13/211* (2014.09); *A63F 13/212* (2014.09);
(Continued)

(58) Field of Classification Search
CPC ........ G06F 3/147; A63F 13/211; A63F 13/212
(Continued)

(56) References Cited

U.S. PATENT DOCUMENTS

2012/0075430 A1    3/2012   Ito et al.
2012/0327117 A1*  12/2012   Weller .................. G06T 19/006
                                                            345/633
(Continued)

OTHER PUBLICATIONS

Anonymous, "Grand Theft VR", Sep. 29, 2016, Retrieved from the Internet: URL:https://web.archive.org/web/20160929034830/http://grandtheftvr.com/retrieved on Dec. 18, 2017, the whole document.

(Continued)

*Primary Examiner* — Hai Tao Sun
(74) *Attorney, Agent, or Firm* — Penilla IP, APC

(57) ABSTRACT

A method and system for integrating audience participation content into virtual reality (VR) content presented by head mounted display (HMD) of an HMD user is provided. The method includes providing a VR scene to the HMD of an HMD user and receiving indications from one or more spectator devices of one or more spectators that correspond to requests for audience participation content for participating in the VR scene. The method and system is capable of sending audience participation content to the spectator devices for enabling spectator interactivity with the audience participation content via respective spectator devices. The method and system provided also enables a receiving of the spectator input, which may then be subsequently integrated into the VR scene of the HMD.

20 Claims, 6 Drawing Sheets

(51) Int. Cl.

| | |
|---|---|
| *A63F 13/25* | (2014.01) |
| *A63F 13/213* | (2014.01) |
| *A63F 13/86* | (2014.01) |
| *A63F 13/212* | (2014.01) |
| *A63F 13/87* | (2014.01) |
| *G06F 1/16* | (2006.01) |
| *G06F 3/0481* | (2013.01) |
| *G06F 3/0484* | (2013.01) |
| *G06F 3/0488* | (2013.01) |
| *G06T 19/00* | (2011.01) |

(52) U.S. Cl.
 CPC ............ *A63F 13/213* (2014.09); *A63F 13/25* (2014.09); *A63F 13/26* (2014.09); *A63F 13/5255* (2014.09); *A63F 13/86* (2014.09); *A63F 13/87* (2014.09); *G06F 1/163* (2013.01); *G06F 1/1637* (2013.01); *G06F 3/0481* (2013.01); *G06F 3/0488* (2013.01); *G06F 3/04845* (2013.01); *G06T 19/006* (2013.01)

(58) Field of Classification Search
 USPC ......................................................... 345/633
 See application file for complete search history.

(56) References Cited

U.S. PATENT DOCUMENTS

| | | | |
|---|---|---|---|
| 2013/0083173 A1* | 4/2013 | Geisner | G06F 3/013 348/51 |
| 2013/0173915 A1* | 7/2013 | Haulund | H04L 9/3226 713/159 |
| 2015/0193979 A1* | 7/2015 | Grek | G06F 1/1694 345/633 |
| 2015/0243078 A1 | 8/2015 | Watson et al. | |
| 2016/0188153 A1* | 6/2016 | Lerner | G06F 3/0488 709/206 |

OTHER PUBLICATIONS

Anonymous, "The Free GTAV IFRUIT and Game Manual Companion Apps", Sep. 16, 2013, XP055436253, Retrieved from the Internet: URL:https://www.rockstargames.com/newswire/article/51371/the-free-gtav-ifruit-and-game-manual-companion-apps.html/ retrieved on Dec. 14, 2017, the whole document.
ISR PCT/US2017/053340, dated Mar. 13, 2018, 3 pages.

* cited by examiner

ID OF PRIORITY

INTEGRATING AUDIENCE PARTICIPATION CONTENT INTO VIRTUAL REALITY CONTENT

CLAIM OF PRIORITY

This application is a non-provisional of U.S. Provisional Patent Application No. 62/403,025, filed on Sep. 30, 2016, entitled "INTEGRATING AUDIENCE PARTICIPATION CONTENT INTO VIRTUAL REALITY CONTENT," which is hereby incorporated by reference.

FIELD OF THE DISCLOSURE

The present disclosure relates to integrating audience participation content (APC) into virtual reality (VR) content provided by an HMD, and more particularly, methods and systems for providing audience participation content to one or more spectators and integrating spectator input in response to the audience participation content into the VR content.

BACKGROUND

Virtual reality (VR) scenes provided by head mounted displays (HMDs) are becoming a more and more popular medium for consumers to interact with content. While part of the allure of VR is its ability to virtually transport a user into an environment detached from his or her real world surroundings, there are many circumstances in which a complete detachment from the real world becomes a detriment to the VR experience. This is may be the case for social situations in which one or more spectators are watching an HMD user interact with a VR scene.

Typically, while spectators are able to engage with the user's VR activity by watching it via a social screen, they are prevented from participating in it. In certain social situations involving VR activity, spectators may wish participate in a VR scene of an HMD user by helping the HMD user or otherwise decide an outcome for the user within a VR environment. The HMD user may likewise wish to receive a form of audience participation to promote cohesion of the social group. Thus, there is an opportunity to increase audience-to-user, user-to-audience, and intra-audience engagement by providing audience participation content for spectators to interact with and subsequently using the resulting audience input as causal determinants to VR content navigated by the user.

It is in this context that embodiments of the disclosure arise.

SUMMARY

Embodiments of the present disclosure provide methods and systems for integrating audience participation content (APC) into virtual reality content, and more specifically, for generating an APC call to be delivered to a spectator device, receiving a resulting input of the spectator, and determining and integrating an outcome of said inputs into a virtual reality (VR) scene of an head mounted display (HMD) user. It should be appreciated that the present disclosure can be implemented in numerous ways, such as a process, an apparatus, a system, a device or a method on a computer readable medium. Several inventive embodiments of the present disclosure are described below.

In certain embodiments, a computer-implemented method may include operations for providing spectator interactivity with virtual reality content presented by a head mounted display of an HMD user. According to these embodiments, the method involves providing a VR scene to the HMD of the HMD user and sending a request to a client device of a spectator for spectator input. The client device is configurable to generate one or more markers in response to the spectator input that is to be displayed on a display associated with the client device, wherein the spectator input is configured to provide interactive input to the VR scene. The method further includes operations for capturing one or more images from a VR interactive space that is inclusive of the spectator using one or more image capture devices. In these embodiments, the images are usable to detect the one or more markers displayed on the display associated with the client device of the spectator. Moreover, according to certain embodiments, the method also includes operations for providing interactive input to the VR scene based on the detected markers, wherein the interactive input is configured to be integrated into the VR scene to change an appearance, or a progress, or a state of the VR scene.

In another embodiment, a computer-implemented method for processing operations for integrating audience participation content into VR content presented by an HMD of an HMD user includes providing a VR scene to the HMD of the HMD user. According to these and other embodiments, the method includes receiving indications from one or more spectator devices of the respective one or more spectators, the indications corresponding to requests for audience participation content for participating in the VR scene. Additionally, the method includes an operation for sending audience participation content to the one or more spectator devices, which is configured to be displayed on respective displays associated with the one or more spectator devices. According to these and other embodiments, the audience participation content includes interactive content for obtaining spectator input from the one or more spectator devices. The method further includes operations for receiving spectator inputs from the one or more spectator devices for determining an outcome based on the spectator inputs in response to the interactive content of the audience participation content. In these embodiments, the method also includes operations for integrating the outcome based on the spectator inputs in response to the interactive content of the audience participation content into the VR scene.

In another embodiment, a non-transitory computer-readable storage medium storing a computer program includes program instructions for providing a VR scene to an HMD of an HMD user. The storage medium also includes program instructions for obtaining indications from one or more spectator devices of respective one or more spectators that correspond to requests for audience participation content for participating in the VR scene. According to this and other embodiments, the storage medium further includes program instructions for sending audience participation content to the one or more spectator devices, the audience participation content including interactive content configured to be displayed on respective displays associated with the one or more spectator devices. The audience participation content may additionally configure the one or more spectator devices to register spectator input in response to the one or more spectators interacting with the interactive content of the audience participation content. In these embodiments, the computer-readable storage-medium may also include program instructions for obtaining the spectator input for determining an outcome based on the spectator input in response to the one or more spectators interacting with the interactive content of the audience participation content and program instructions for integrating the outcome based on the spectator input into the VR scene.

Other aspects of the disclosure will become apparent from the following detailed description, taken in conjunction with the accompanying drawings, illustrating by way of example the principles of the invention.

BRIEF DESCRIPTION OF THE DRAWINGS

The disclosure may best be understood by reference to the following description taken in conjunction with the accompanying drawings in which.

DETAILED DESCRIPTION

Figure 1:
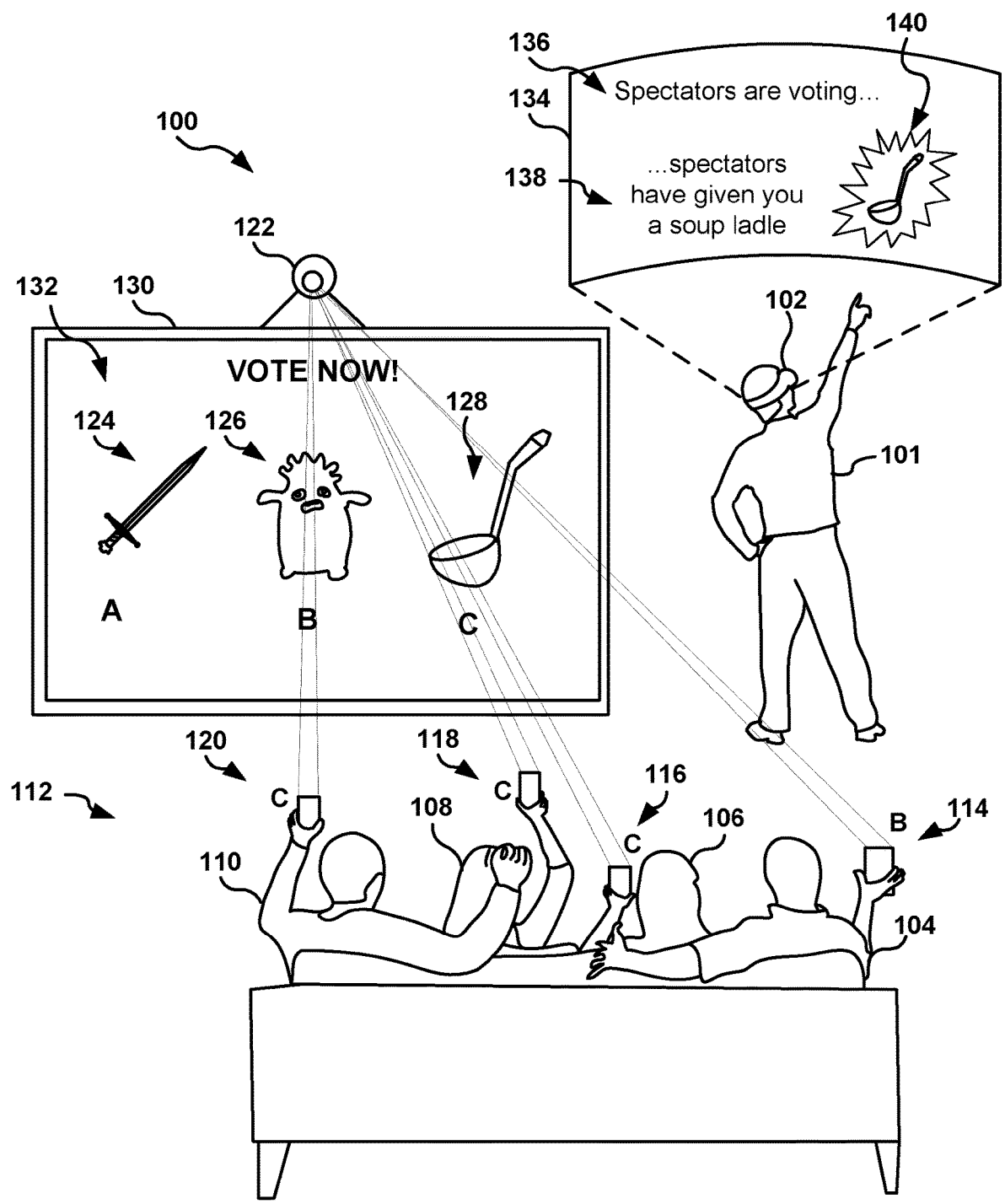
FIG. 1 shows an embodiment of a social virtual reality interactive space where audience participation content (APC) is being delivered to a social screen and subsequently integrated into a progress of a VR scene navigated by an HMD user.

The following embodiments describe methods, computer programs, and apparatus for processing operations for integrating audience participation content (APC) into virtual reality (VR) content. It will be obvious, however, to one skilled in the art, that the present disclosure may be practiced without some or all of these specific details. In other instances, well known process operations have not been described in detail so as to not to unnecessarily obscure the present disclosure.

VR scenes or environments are typically configured to be navigable by a single user at a time via an HMD and/or one or more controllers. Moreover, as HMDs are designed to provide a completely immersive auditory and visual experience, HMD users interacting with VR content may experience a disconnect from their real world settings. This disconnect can be less than optimal in a number of situations, but it is especially so in social situations where an audience of spectators is watching an HMD user interact with VR content.

To increase engagement of spectators within a social group, a social screen may be provided to the audience of spectators. The social screen may have, for example, a projection of the HMD user's VR experience in real-time so that the audience may engage in the HMD user's progress within a VR scene. Although social screens allow for some level of engagement, there is still little opportunity for an audience to participate in the HMD user's progress within the VR scene. That is, audience members often feel a detachment from a VR scene navigated by an HMD user due to their inability to cause any meaningful change to the VR scene or the HMD user's progress therein. In a similar sense, HMD users navigating a VR scene may wish to receive causal input from an audience.

One method of increasing engagement of an audience with a VR scene of an HMD user is to provide audience participation content (APC) to a mobile device (e.g., mobile phone, tablet, smartwatch, laptop, etc.) of spectators within the audience. In certain embodiments, once an APC call (e.g., a request for spectator input) is delivered to a mobile device of a spectator, the spectator may then interact with the APC on his or mobile device. In certain cases, the interaction may request a selection for a vote. In other embodiments, the APC may request completion of a task involving skill (e.g. a game within a game) such as a puzzle, trivia, pattern recognition, building something virtually similar to Minecraft, farming for game assets or currency, creating a weapon, reloading a weapon, upgrading a weapon, interrogating an in-game character for information, reading a map for directions, securing a transport vehicle, etc. Embodiments such as those requesting completion of a task are referred herein as APC tasks. Embodiments such as those requesting a vote are referred herein as an APC vote.

In still other embodiments, APC tasks may request a spectator perform a (virtual) task involving luck, such as a roll of a dice, flip of a coin, spin of a wheel, crank a slot machine or other platform for allowing a spectator to randomly (or semi-randomly) choose an outcome. In these embodiments, even though outcomes of the APC may be random or semi-random, they nevertheless give a sense of agency to the spectator for creating or otherwise being responsible for the outcome.

Further embodiments of APC may include allowing a spectator to send a message or donate a game asset or currency. Embodiments such as these are referred herein as APC communications.

In all of the aforementioned embodiments, there is some form of audience participation through interacting with the APC. The result of the audience interaction with the APC may also be known as APC input or spectator input. For example, APC input may include a vote, a donation, completion of a task, a message, or some other input provided by an audience member in response to APC. According to some embodiments, APC input is communicated to a VR system via a QR code that is displayed by the device of the spectator. According to these embodiments, the spectator may be instructed to raise his mobile device displaying the QR code for a camera of the VR system to capture. In these embodiments, the spectator, having to physically raise his mobile device, is given a greater sense of agency and engagement with respect to his input.

A number of different types of markers may also be used according to other embodiments for communicating spectator input to the computing device of the HMD. For example, a drawing, an audio sound, a graphic, or a combination of two or more thereof may all be used to communicate spectator input to the computing device of the HMD.

Although raising a QR code or marker or indication for a camera to capture allows for a greater sense of participation and engagement with the HMD user, there are a number of other embodiments that may not require or make use of a QR code to communicate an APC inputs. For example, if the spectator device is connected to the VR system via wireless connection, the spectator device may communicate APC input via the same connectivity.

In other embodiments, to create a greater sense of engagement and agency for spectator who is responding to an APC call, the spectator may be instructed or requested to move his device or his self physically about the social virtual reality interactive space. The example is meant to illustrate that certain embodiments include physical activity, tasks, drills, or miming, to be part of APC.

In certain embodiments, each of the spectators is given the same APC, as might be the case for an APC requesting a vote. In other embodiments, different APCs are delivered to different audience members. In certain embodiments, audience members may be able to choose between different APCs. In other embodiments, it may be predetermined which spectator receives which APC.

In general, in order for a VR system to deliver APC to a spectator device, the two should be connected. In some embodiments, a spectator may request to receive APC from a VR system by opening an application on his mobile device. The application may then display a quick response (QR) code for the spectator to flash to a camera of the VR system. The QR code, once read, identifies the mobile device as a spectator and schedules an APC call to be communicated with the mobile device. In other embodiments, the VR system may recognize a mobile device of a spectator via Bluetooth connection, near-field communication (NFC), Wi-Fi, or GPS. In other embodiments, spectators may flash a QR code with their user devices to an image capture device associated with the VR system. The image capture device may then read the QR code and subsequently pair or link one or more user devices with the VR system or a computing device associated with the VR system.

In some embodiments, VR environments or scenes may be designed with APC in mind. At one extreme, certain embodiments of VR content may be designed around audience participation, for example, highly social games designed for two or more players. In other embodiments, VR content may be designed to highly reward HMD users when an audience participates through APC. In still other embodiments, VR content may not necessarily be designed to feature APC or to have built-in APC. In these embodiments, APC may still be supported with the use of an APC insertion logic, which analyzes VR content and game state trajectory to find a window within the VR content trajectory that is fit to insert APC.

For example, the APC insertion logic may determine that there is a window of low activity (or user input) a few moments in the future. It may then instantiate APC using an APC generator to be delivered to the audience within the window of low activity. In some embodiments, the APC generator communicates with a VR content generator to determine what to include within the APC. For example, the APC content generator may determine from the VR content generator a set of variables within the VR content that are fit to be included within an APC call. According to some embodiments, the APC call may cause in game variables to change, such as a weapon, an avatar, a background setting, an enemy monster, a voice of an enemy, a direction of gravity, or a difficulty of a game setting. In other embodiments, the HMD user is able to initiate an APC call to his spectators.

Once an APC call is delivered to a mobile device of a spectator and returned with APC input from the spectator, the VR system is configured to determine an APC outcome accordingly. For example, if an APC was called for a vote on which of three weapons A, B, or C the HMD user is to be provided with, and three APC inputs are received for weapon C and only one for weapon A, then weapon C would become the APC outcome.

In certain embodiments, the APC outcome is integrated into the VR scene by an APC integration logic. For example, the APC integration logic may instruct the VR content generator to render and provide weapon C for the HMD user to use.

As used herein, a 'VR scene' is taken to mean the set of visual and auditory outputs at any given moment of a virtual reality capable device that includes virtual reality content. Furthermore, as used herein, a VR environment is meant to denote the set of conditions that are sufficient to provide an environment that may be perceived as a virtual reality.

As used herein, 'APC' is generally taken to encompass content directed to an audience for audience participation or feedback or input, as well as the resulting input by the spectator, a resulting outcome of the resulting inputs, and VR content that has been altered due to integration of audience input. In other senses, it is also meant to be inclusive of content displayed on a social screen in addition to spectator devices.

An 'APC call' is meant to denote a call or request for audience participation. An APC call or request is instantiated by sending data over network to one or more client devices associated with audience members that include APC. In some embodiments, an APC insertion logic determines a window of time within a VR scene in which to place an APC call. In these embodiments, an APC generator might decide on what the APC call may contain (e.g., a vote on a weapon). Additionally, an APC call may also refer to that which is received and displayed on a spectator device as a result of the APC call.

As used herein 'APC input' or 'spectator input' is taken to mean any detected set of inputs or actions made by a spectator, typically as a result of spectators interacting with interactive content delivered by audience participation content. However, it should be noted that certain spectator inputs may be provided by spectators outside of interacting with audience participation content. As earlier mentioned, APC inputs or spectator inputs may include a vote, a donation, a message, completion of a task (e.g., game within a game), an input corresponding to a game action for the HMD user, a selection for the HMD user, a joint action made with the HMD user, or a combination of two or more thereof. APC input, once delivered back to the VR system hosting the HMD user may then be used to determine an APC outcome.

In general, spectator input may be configured to be integrated into the VR by augmenting the VR scene in some way. Many types of augmentation are possible with the method and system discussed herein. In certain embodiments, augmenting the VR scene may involve integrating the spectator input to change an appearance of the VR scene in some manner. In other embodiments, augmenting the VR scene may involve changing progress of VR content or changing a state of content. For example, if the VR scene includes a VR game, the augmentation may include changing a game state of the VR game. In still further embodiments, augmenting the VR scene may include providing interactive input for the HMD user. According to these and other embodiments, augmentation may include providing an input into the VR scene such as those that may be provided by a controller associated with the VR scene. In other embodiments, the augmentation may involve integrating spectator input into the VR scene such that parameters associated with the VR scene are changed according to the spectator input.

In general, VR scenes may include many different types of media or content. For example, in certain embodiments the VR scene may include a VR game, a VR tour, a VR movie, a VR commercial, or a VR conference call or communication.

As used herein, 'APC outcome' refers to the end result or outcome of one or more APC inputs with respect to a future game state of the HMD user. For example, a ballot result of weapon C is an APC outcome insofar as it is an outcome of APC inputs (votes) and causally affects a future game state of the HMD user (the HMD user will be given weapon C).

As used herein, 'APC integration' and 'integrating APC' refers to computational processes that make APC outcomes and/or inputs a part of the VR scene or environment of the HMD user. Thus, APC integration may include rendering a next segment of a VR scene to include a version of weapon C to be wielded by the HMD user.

As used herein, 'social VR interactive space' refers to a real world setting in which an audience of one or more spectators may observe an HMD user interact with VR content first hand.

As used herein, an 'APC task' is a task, challenge, or game within a game delivered to a spectator device requiring the spectator to provide APC input.

In general, the term 'VR system' is taken to mean at least a minimum set of components that allow for integrating audience participation content into the VR scene. For example, a VR system as used herein may comprise of at least one HMD, at least one computing system or device, and at least one spectator detection or capture device. Spectator capturing devices may include, by way of example, one or more cameras, microphones, hand held input devices, or other networked device such as a tablet or a controller.

In some embodiments, the VR system may include a computing device or system that is separate from the HMD while in other embodiments, the computing device or system may be an integral part of the HMD. For example, in some embodiments, the computing device of the HMD may be a mobile computing device associated with a mobile phone. In these embodiments, the computing device may be attachable to the HMD. In other embodiments, the computing device may be a game console or a standalone computer that is connected to the HMD. In still other embodiments, the HMD may house the computing device.

FIG. 1 shows an embodiment of a social VR interactive space 100 having an HMD user 101 being presented with a VR scene 134 via an HMD 102. The social VR interactive space 100 is also shown to include an audience 112 of spectators 104, 106, 108, and 110, all of whom are watching HMD user 101 navigate the VR scene 134 via a social screen 130. Each of spectators 104, 106, 108, and 110 are shown to be tracked via image capture device 122. Although only one image capture device 122 is shown in the figure, there may be any number of such devices located within the social VR interactive space 100. Image capture device 122 communicates with a computing system (not shown) either coupled to HMD 102 or housed within HMD 102.

An APC call 132 is shown to be displayed on social screen 130 in FIG. 1. The APC call 132 is shown to include a request for a vote among three game asset choices: 124, 126, and 128. HMD user 101 is made aware of a state of voting via indication 136 within the VR scene 134. In response to the APC call 132, spectators 104, 106, 108, and 110 each provide an APC input via their respective mobile devices 114, 116, 118, and 120. In certain embodiments, each APC input includes a corresponding QR code (not shown) to be displayed by each spectator device and subsequently captured by image capture device 122.

It is contemplated that according to certain embodiments that APC call 132 is also displayed to one or more of the mobile device 114-120 in addition to or instead of social screen 130. As a result, spectators 104-110 may be made aware of the APC call 132 by simply looking at their respective mobile devices.

Spectators 106, 108, and 110 are shown to have voted for game asset C 128, while spectator 104 is shown to have voted game asset B 126. The VR system determines the APC outcome of the APC call 132 to be game asset C 128, which happens to be a soup ladle. The APC outcome is made known to HMD user 101 via an indication 138 displayed within VR scene 134. In some embodiments such as in the embodiment shown in FIG. 1, APC integration may provide a display of APC outcome 140 to HMD user 101. In this embodiment, the HMD user 101 is explicitly shown what the APC outcome is via text notification indication 138 and/or visual display of APC outcome 140.

In other embodiments, APC integration may proceed to provide a succeeding VR scene without specifically pointing out the APC outcome 140 to HMD user 101. For example, if HMD user 101 is already interacting with a VR scene via HMD 102, the HMD user 101 may suddenly discover that the weapon he is yielding is a soup ladle associated with APC outcome 140. Thus, whether a VR scene pauses for APC outcomes or whether APC outcomes occur in sync or in real-time with a VR scene will depend on various embodiments, although either may be used in a single VR scene.

Figure 2:
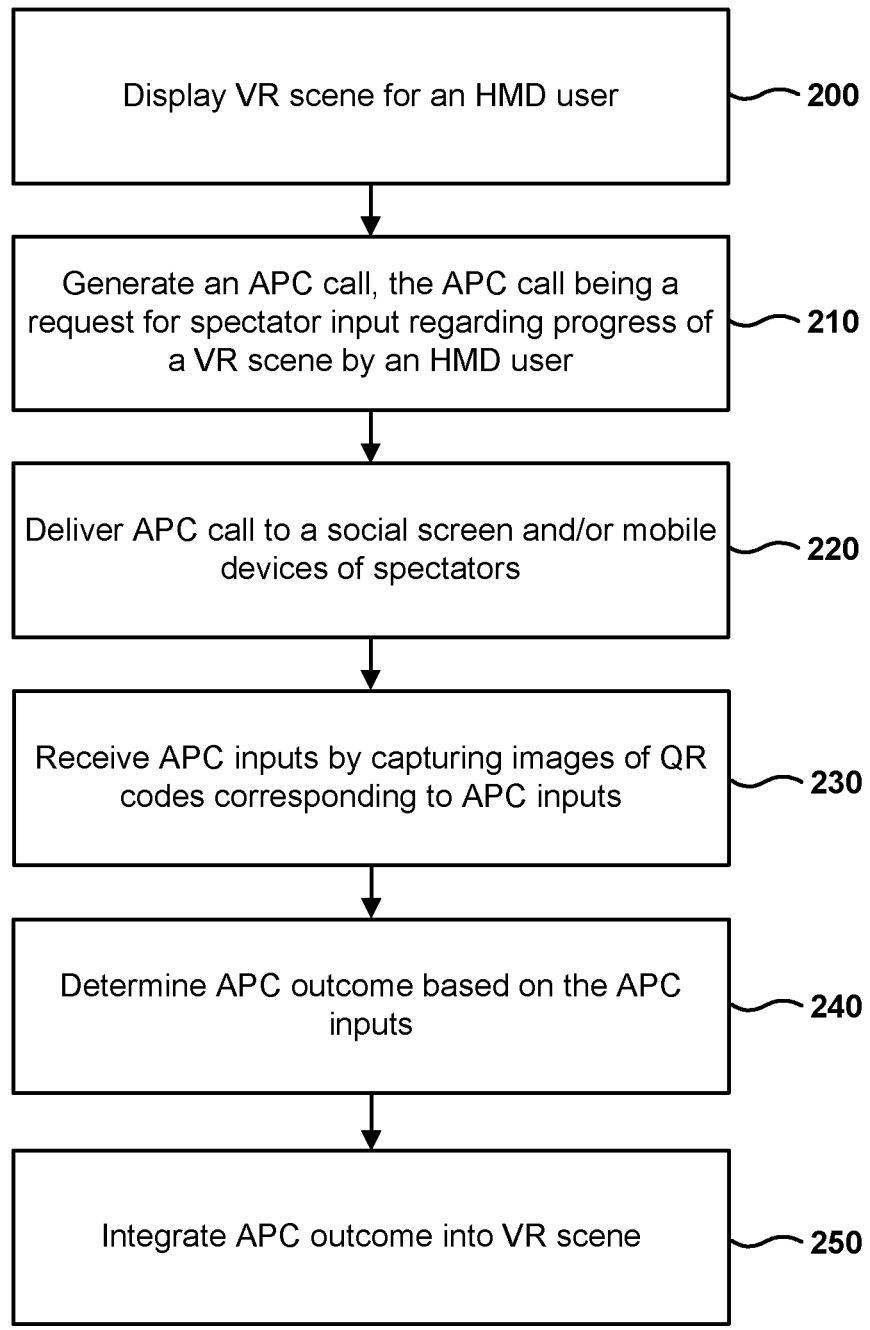
FIG. 2 illustrates an overall flow of a method for generating and delivering an APC call, receiving APC inputs, determining an APC outcome, and integrating APC outcomes into a VR scene.

FIG. 2 shows an embodiment of an overall flow of a method for integrating APC into VR content. Operation 200 is configured to display a VR scene for an HMD user. In operation 210, the method is configured to generate an APC call. As earlier discussed, an APC call may include a request for APC input that is displayed on a spectator device or a social screen within the social VR interactive space. Although not shown, there are many ways for the method to flow to or trigger operation 220. For example, operation 220 may be built into VR content such that an APC call is generated at particular moments within the VR content by design. In other embodiments, operation 220 may be triggered by HMD user input, by the particulars of the VR scene, or by spectator input.

The method then flows to operation 220, wherein the APC call is delivered to a social screen and/or mobile devices of spectators. For example, if the APC call is for a spectator vote, the social screen may display the choices of the vote. If instead or in addition the APC call is for spectators to complete tasks requested of them, the social screen may display one or more tasks requested of the spectators. As discussed above, certain embodiments of APC calls will request different tasks of different spectators whereas other embodiments may request the same task of each spectator. In certain other embodiments, the spectators may choose from a set of APC tasks displayed on the social screen and/or their mobile devices.

Once a spectator has successfully interacted with a given APC call such as an APC task, APC vote, or APC communication, the resulting APC input is received by the method in operation 230. In certain embodiments, APC input is received via image capture of QR codes displayed by spectator devices. In these embodiments, each QR code is unique to the spectator, the APC call, and the APC input. For example, according to the method, a certain QR code may represent a certain APC input by a certain spectator device. As a result, once the QR code is read by the method, an APC outcome may then be determined in the following operation, for example, in operation 240.

As discussed previously, operation 240 of the method may include reading QR codes to ascertain, tabulate, compare, or otherwise analyze APC inputs to determine an APC outcome. Depending on the nature of the APC calls generated in operation 210, APC outcomes may take one of a number of forms in operation 240. For example, if operation 210 generated an APC call including an APC vote, then operation 240 would simply determine the APC input with the most votes to be the APC outcome. In this case, a single variable is being voted on. Thus, an APC outcome would define said variable as a particular value.

However, if operation 240 generated APC calls including a different APC task for each spectator, the particulars of how operation 240 determines an APC outcome will depend on the type of APC call and APC task. In some embodiments, for example, if each APC task is to roll a dice to determine a number of points to award the HMD user, a resulting APC outcome might be simply to sum up each individual APC input (dice roll result). In other embodiments, APC inputs may interact non-linearly, synergistically, antagonistically, or not at all with respect to determining an APC outcome.

In certain embodiments, each QR code may be generated as a result of a single APC input. For example, if an APC call included a request for spectators to vote twice regarding a first virtual item and a second virtual item, a first QR code may be generated corresponding to the first APC input (e.g., the vote regarding the first virtual item) and a second QR code may be generated corresponding to the second APC input (e.g., the vote regarding the second virtual item). As a result, the spectator may need to have both QR codes read by an image capture device associated with the system. In other embodiments, a QR code may be generated that corresponds to more than one APC input. For example, a single QR code may be generated based on the two votes regarding the first and second virtual item.

After an APC outcome is determined, the method then flows to operation 250, which is configured to integrate the APC outcome into a VR scene of an HMD user. As discussed earlier, this operation may be carried out by an APC integration logic of the VR system. In some embodiments, spectators are able to view the APC outcome on the social screen.

Figure 3:
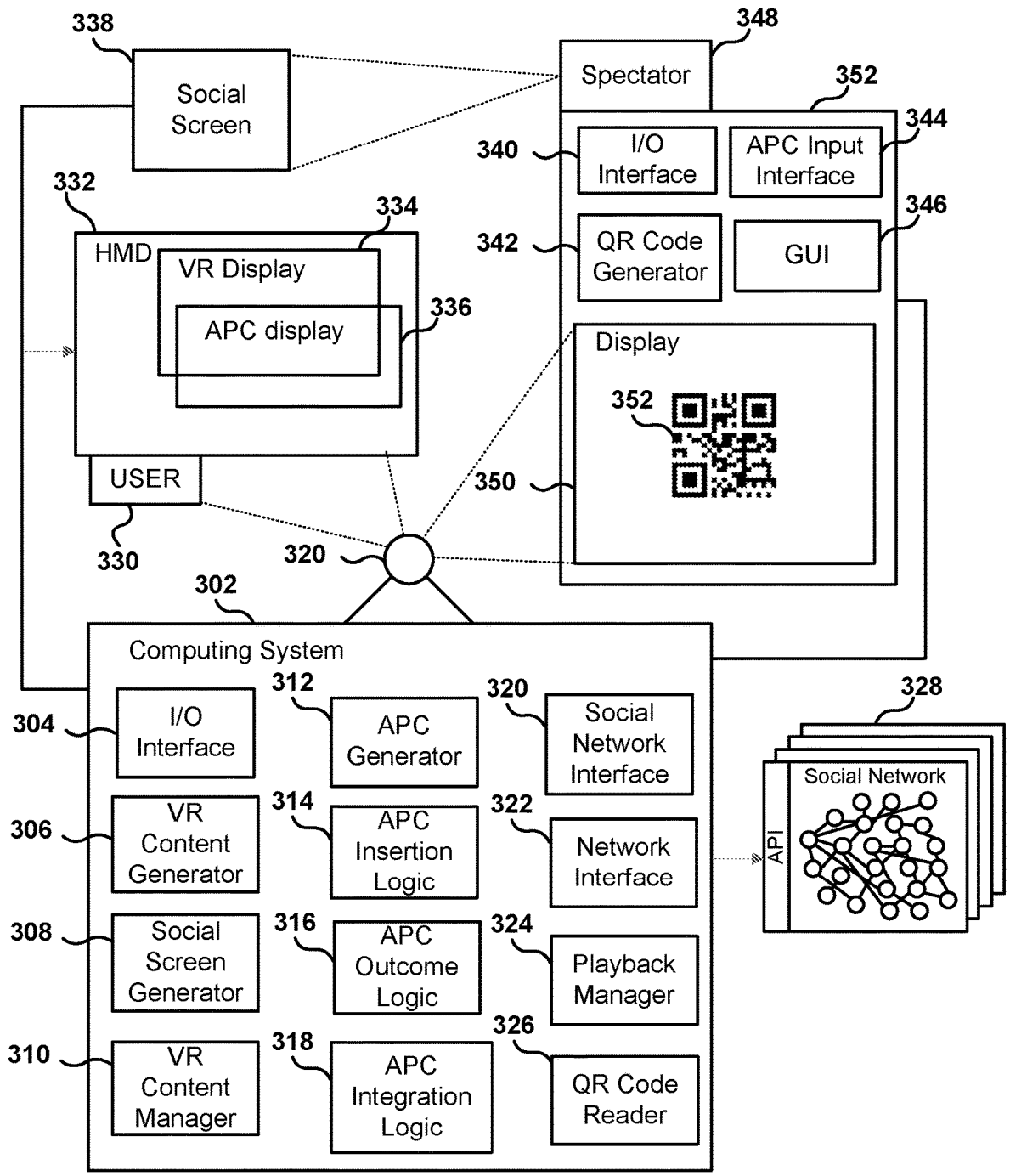
FIG. 3 shows an embodiment of a VR system capable of delivering APC to a device of a spectator and integrating the APC into a progress of a VR scene of an HMD user.

In FIG. 3, an embodiment of a VR system that is able to integrate APC into VR content is shown. In particular, a computing system 302 is shown to include the following components: I/O interface 304, VR content generator 306, social screen generator 308, VR content manager 310, APC generator 312, APC insertion logic 314, APC outcome logic 316, APC integration logic 318, social network interface 320, network interface 322, playback manager 324, and QR code reader 326. According to the current embodiment, computing system 302 is interfaced with a social screen 338, HMD 332, spectator device 352, and social network 328 via I/O interface 304 and/or network interface 322.

According to the embodiment shown, VR content generator 306 is able to provide HMD 332 with VR scenes. VR content generated by VR content generator 306 is also used by social screen generator 308 to provide a 2-dimensional (or 3-dimensional) representation of VR content to be displayed to a secondary display viewable by an audience. Also shown in the current embodiment is a VR content manager, which is responsible for interfacing with VR content generator 306 and APC generator 312 to decide on the particulars of integrating APC into VR content. For example, the VR content manager 310 may provide a set of game-related variables that may become the subject of APC. Conversely, VR content manager 310 may also protect certain aspects VR content from becoming subject to audience participation.

APC generator 312, as mentioned previously, communicates with VR content manager 310 to decide a subject matter for what APC is to include. It is also configured to generate APC calls based on a decided subject matter. For example, APC generator 312 may learn from VR content manager 310 that VR content being presented to HMD user is a game of Sisyphus, wherein a player attempts to push a large boulder up a tall mountain. APC generator 312 may also learn from VR content manager 310 that certain game parameters may not be subject to audience participation (e.g., that the boulder inevitably falls back down the mountain), yet other parameters may be decided by audience participation (e.g., the type of shoes Sisyphus wears). APC generator 312 may then produce an APC call including a vote on what types of shoes an audience wishes to bestow upon Sisyphus. APC generator 312 is also configured to send the APC call out to social screen 338 and spectator device 352.

Computing system 302 is also shown to include an APC insertion logic 314, which also interfaces with VR content manager 310 to decide on an appropriate time/place within the VR scene to deliver the APC call. For example, APC insertion logic 314 may determine that a window of time in which the boulder is falling back down the mountain is a suitable place to invite audience participation (e.g., deliver APC calls to spectator device 348). According to these embodiments, the HMD user is not unnecessarily distracted by audience participation during games states of high activity requiring a higher level of user attention.

Once APC calls are delivered to spectator devices 352, APC input may then be received back at the computing system 302. APC outcome logic 316 is configured to determine an APC outcome based on those APC inputs. For example, if a majority of spectators voted to give Sisyphus a pair of Crocs slippers, then the APC outcome logic 316 would produce an APC outcome of Crocs slippers for Sisyphus to wear within the VR scene. APC integration logic 318 is configured to integrate APC outcomes determined by the APC outcome logic 316 into the VR content. In these embodiments, for example, APC integration logic 318 may instruct with VR content generator 306 to provide Sisyphus with the Crocs slippers.

Social network interface 320 is able to provide an ability of sharing or streaming a VR scene with or without APC to a social network 328. In certain embodiments, social network interface 320 may share clips of a VR scene coupled with a recording of audience reactions and/or participation. Network interface 322 allows for the computing system 302 to communicate with the Internet, as well as the social screen 338, the HMD 332, and spectator devices 348, according to some embodiments. In other embodiments, a wired connection may be used to connect the computing system 338 to either the social screen or the HMD 332, or both.

Although HMD 332 is shown to be a standalone device connected to computing system 302, it should be appreciated that whether HMD 332 is standalone or integrated with computing device 302 is immaterial to the execution and scope of the method or system. For example, in some embodiments, HMD 332 may have a slot or mount for computing device 302, which may be allow for computing device 302 to be attached to and detached from HMD 332 freely. In still other embodiments, HMD 332 may be a standalone device that is connected to computing system 302 either via a wire or wirelessly.

HMD 332 is shown in FIG. 3 to contain a VR display 334 and an APC display 336. In general, the VR display 334 is responsible for providing VR content to HMD user 330. Audience participation content display 336 is to overlap to an extent with VR display 334 to demonstrate that APC may be displayed using the VR display 334, according to certain embodiments. In the same or additional embodiments, APC may be displayed in a dedicated region for APC display 336. Furthermore, although VR display 334 and APC display 336 is shown to be housed within HMD 332, it should be noted that certain other embodiments may have VR display 334 and APC display 336 to be additionally associated with computing system 302. For example, in an above-mentioned embodiment having the computing system 302 that is mountable to the HMD 332, the VR and APC displays 334 and 336 may be physically associated with the computing system 302. Thus, it is understood that the VR and APC displays 334 and 336 are shown to be associated with the HMD 332 for the sake of clarity and is not meant to be limiting.

Also shown in the figure is spectator 348 interfacing with a spectator device 352. The spectator device 352 is shown to include an I/O interface 340, an APC input interface 334, a QR code generator 342, a GUI 346, and a display 350. GUI 346 and display 350 are responsible for displaying an APC call including an APC task or APC vote to spectator 348. The APC call may additionally or alternatively be displayed on social screen 338.

In some embodiments, the APC input interface 344 is configured to receive user input or interaction in response to the APC call. According to some embodiments, the APC input interface 334, once in receipt of an APC input, generates a QR code 352 via QR code generator 342 to be displayed on display 350. Image capture device 320 is shown to capture an image of the display 350, including the QR code 352. As result of capturing the QR code 352, APC input is thus communicated to computing system 302. As earlier mentioned, there are some embodiments that do not require a QR code 352 to be generated or used to communicate APC input. That is, APC input may, in certain embodiments, be communicated to computing system 320 via wireless connection, for example, via Bluetooth, Near Field Communication (NFC), WiFi, intranet, the internet, etc.

In certain embodiments, APC input interface 344 may include physical buttons that are responsive to a user's physical input. In other embodiments the APC input interface 344 may be instantiated via the display 350, for example, if the display 350 is a touch-sensitive display, which in certain embodiments, it is. In still other embodiments APC input interface 344 may be voice sensitive to record audience participation via vocalizations by the audience. Of course, any number of the preceding types of APC input interface 344 may be used in combination with one another.

Figure 4A:
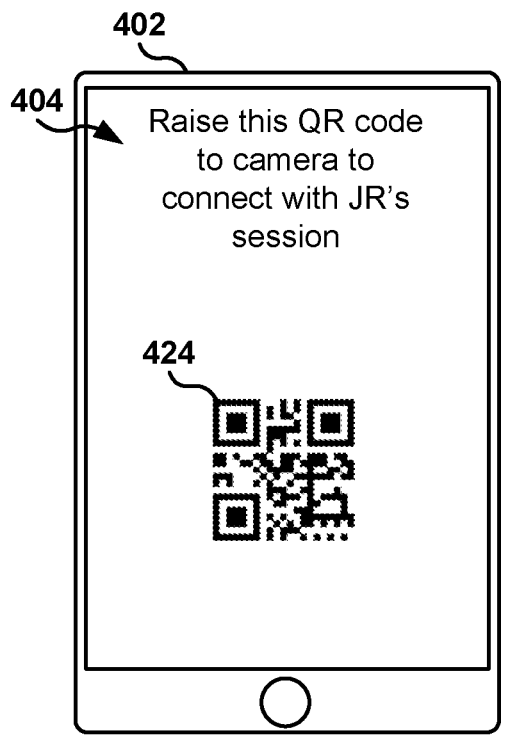
FIGS. 4A-4D show embodiments of APC as they might appear on a device of a spectator.
Figure 4B:
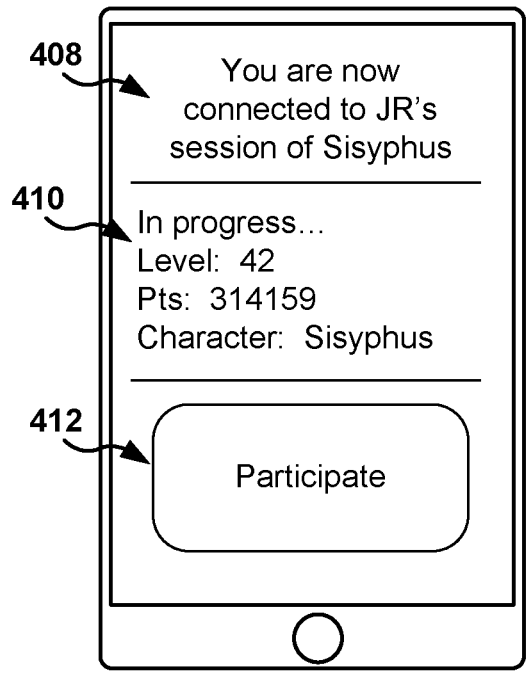
Figure 4C:
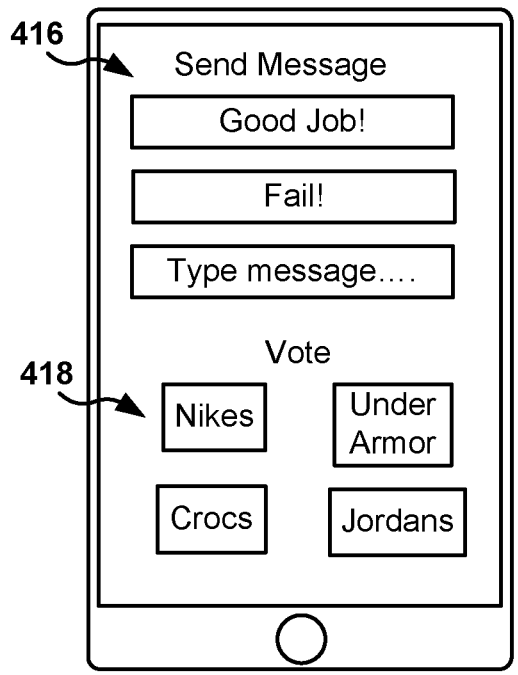
Figure 4D:
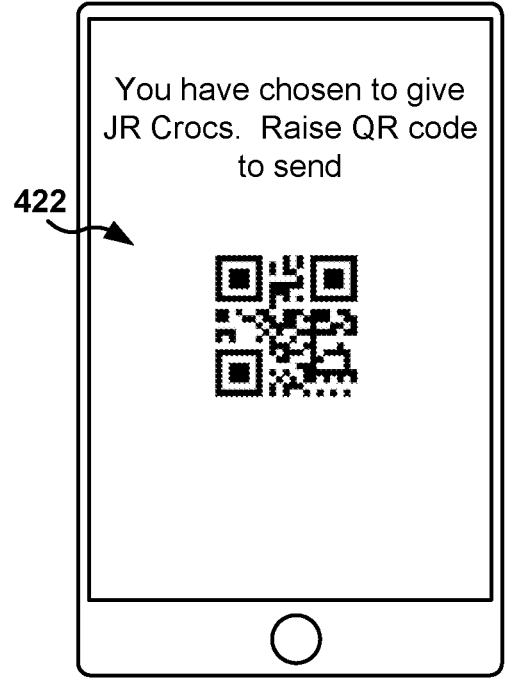

FIGS. 4A-4D show various embodiments of APC or APC input interfaces as they might appear to a spectator viewing a spectator device being presented with APC regarding VR content of an HMD user. For example, spectator device 402 displays instruction 404 for raising a QR code 424 to a camera to connect with an HMD or an associated computing system during a user's VR session. FIG. 4B shows the spectator device displaying preliminary APC after successfully connecting with the HMD user's session. The preliminary APC includes a confirmation 408, stats 410 on the HMD user's progress, and an option to participate 412. If the spectator chooses to participate, FIG. 4C shows an APC call that he may be presented with. For example, the APC call may request a message 416 from the spectator. In certain embodiments like the one shown, more than one APC call may be delivered to a spectator device. In the embodiment shown, a second APC call includes an APC vote 418 for which type of shoes to give JR's character of Sisyphus. If the spectator votes for Crocs, the APC input interface may then instruct the spectator to raise a QR code 422 to send in his vote.

Figure 5:
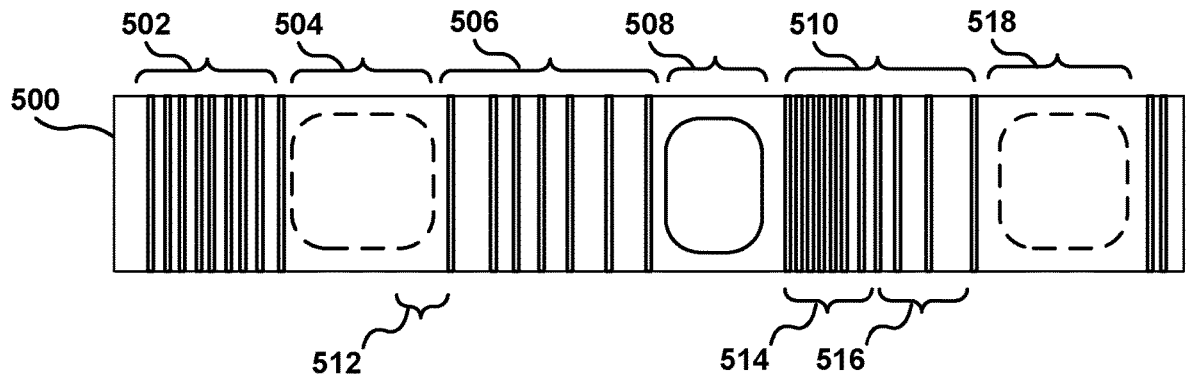
FIG. 5 shows a representation of a VR scene in terms of intervals of high and low activity and how an embodiment of an APC insertion logic might decide when to initiate APC.

FIG. 5 shows a representation of a timeline of a trajectory of a VR content 500 based upon VR scene related activity or event frequency. Each vertical bar represents an arbitrary unit of activity or event, wherein a high density of bars indicates a segment of frequent user activity and/or VR scene related events. The absence of bars is made to indicate an expected lack of user activity and/or VR scene related events. In addition, dotted circled regions within the VR content trajectory represent APC insertion regions, while solid circled regions represent regions non-insertion regions.

For example, segment 502 of VR content 500 has a relatively high activity rate. VR content manager 310 and APC insertion logic 314 may decide, as a result, to not insert APC during segment 502. Instead, APC insertion logic 314 may determine that segment 504 is more suitable for inserting APC. However, although APC may be inserted within segment 504, subsegment 512 may represent a cutoff period in which spectators may no longer provide APC input.

Segment 506 is shown to be a period of low albeit non-zero activity. In these circumstances, the VR content manager 310 may determine that only certain types of APC are permissible, such as APC communications but not APC votes or APC tasks. Segment 508 is shown to be a period of zero activity, much like segment 504. However the solid circled region within segment 508 indicates that no APC is to be inserted. There may be a number of reasons that APC insertion logic 314 is disallowed to insert APC even during segments with low or zero activity.

In certain embodiments, the HMD user may override or veto APC to be inserted during certain periods. In other embodiments, VR content manager 310 may determine that there are no game-related variables that are suitable to be subject to APC. In still other embodiments, APC insertion logic 314 may determine that segment 508 does not allow enough time for an APC in general, or as instructed by APC generator 312. For example, not all APCs take a same amount of time. Some APCs may have a turnaround time of less than about 10 seconds, while other may take up to about 5 or more minutes. Thus, APC insertion logic 314 may communicate with APC generator 312 to determine segment 508 allow enough time, while segment 518 will.

Segment 510 shows a VR content segment with a variable activity level. For example, in sub-segment 514, the activity rate is high, whereas it tapers to a lower rate in sub-segment 516. In some embodiments, VR insertion logic 314 may determine that APC may be inserted towards the end of segment 510, but not at its beginning.

Figure 6:
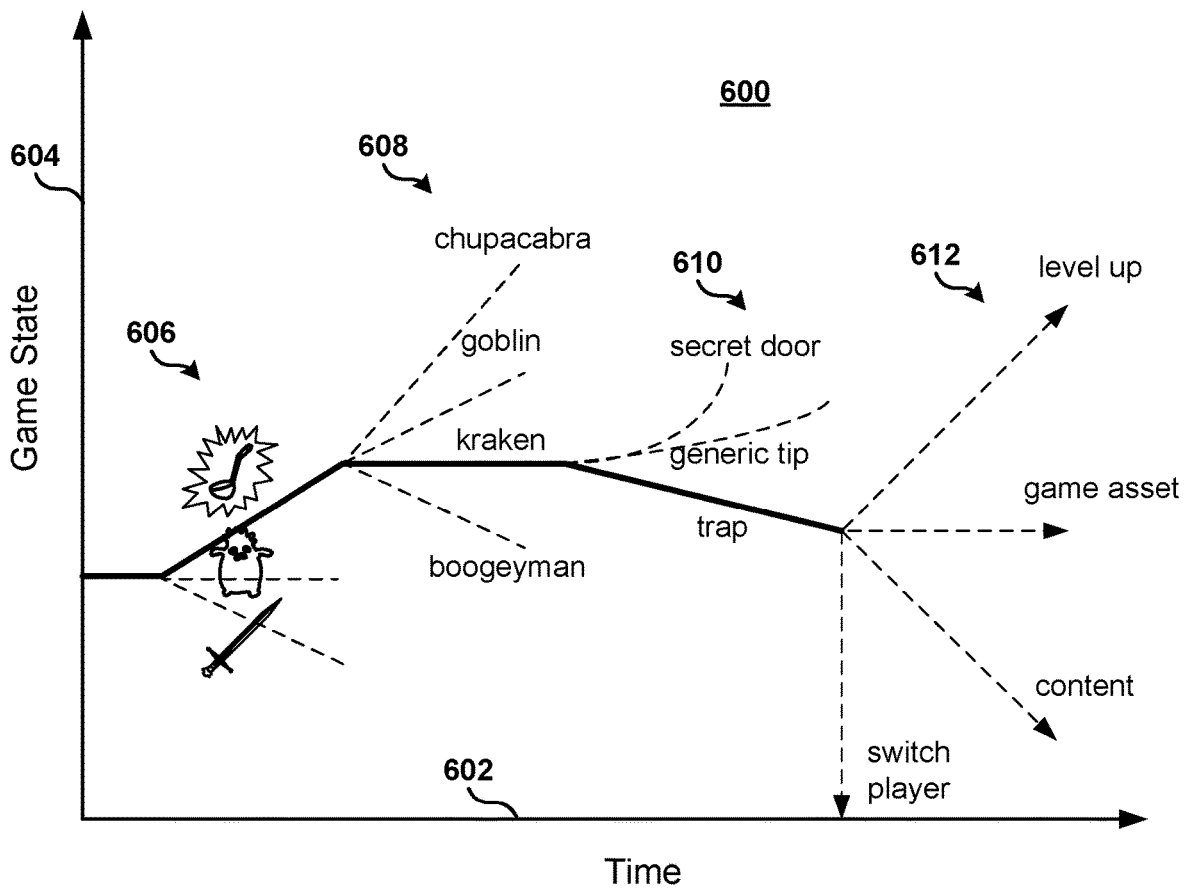
FIG. 6 shows a representation of how integration of various embodiments of APC into VR scene might affect progress within the VR scene.

FIG. 6 shows a representation of VR content 600 in terms of a game state 604 over time 602. Over the course of time 602, the VR content may experience causal changes its game state depending on APC. For example, APC call 606 includes a vote between one of three in-game assets. The APC outcome, the soup ladle causally affects the game state insofar as it changes the HMD user's ability to progress in the game or at least some visual or functional aspect of the VR scene. The same is true of APC call 608, which requests spectators to choose from one of four enemy bosses. In APC communication 610, a spectator provides a communication containing a trap. Additionally, APC call 612 may include a level up, a game asset (donation), some other type of content such as a snap, a GIF, a picture, an emoji, or it could be a request for the HMD user to switch turns.

Figure 7:
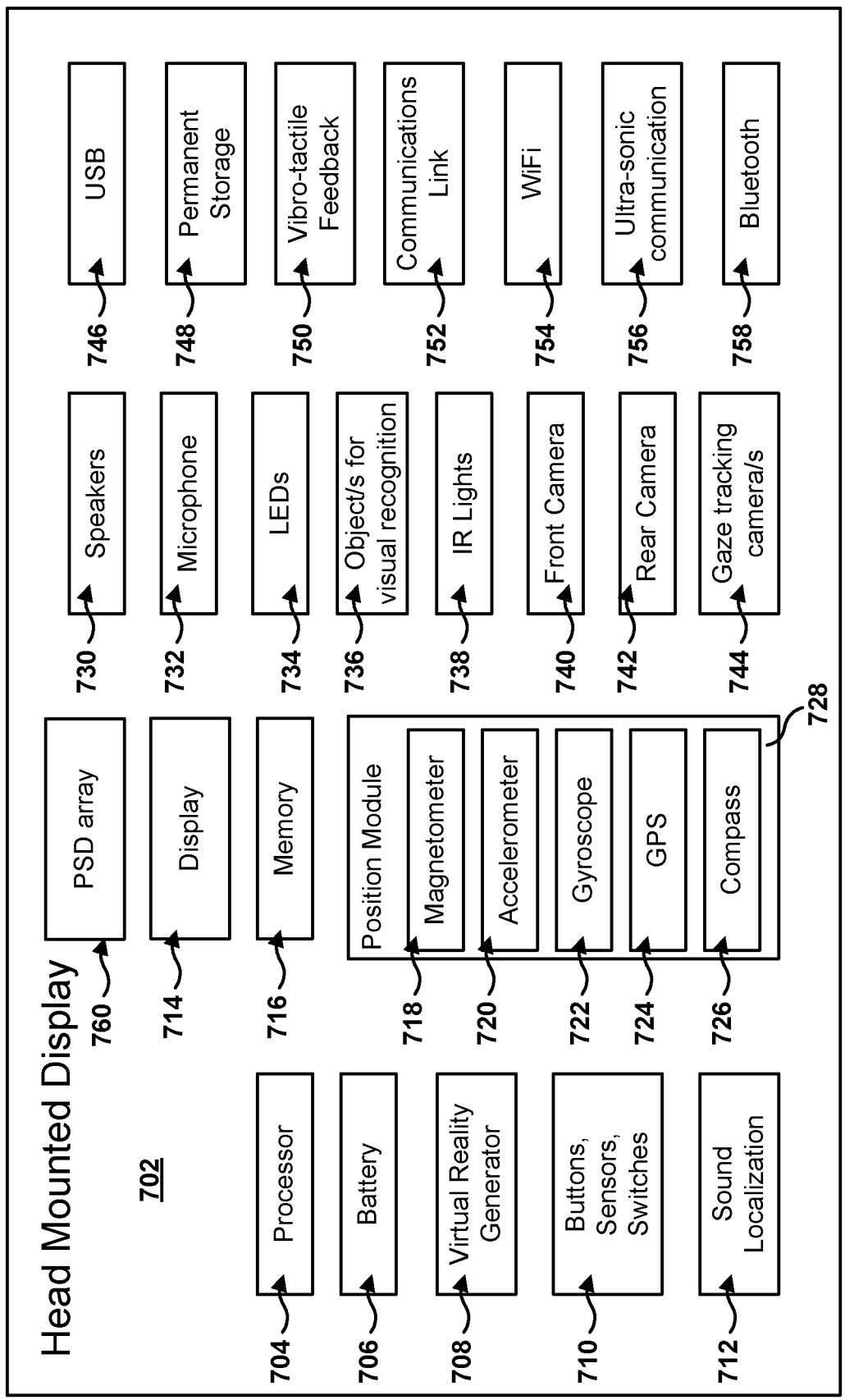
FIG. 7 shows an embodiment of an HMD capable of integrating APC into VR scenes.

FIG. 7 illustrates an additional embodiment of an HMD 702 that may be used with the presented method and/or system. HMD 702 includes hardware such as a processor 704, battery 706, virtual reality generator 708, buttons, sensors, switches 710, sound localization 712, display 714, and memory 716. HMD 702 is also shown to include a position module 728 that comprises a magnetometer 718, an accelerometer 720, a gyroscope 722, a GPS 724, and a compass 726. Further included on HMD 102 are speakers 730, microphone 732, LEDs 734, object/s for visual recognition 736, IR lights 738, front camera 740, rear camera 742, gaze tracking cameras 744, USB 746, permanent storage 748, vibro-tactile feedback 750, communications link 752, WiFi 754, ultra-sonic communication 756, Bluetooth 758, and photo-sensitive diodes (PSD) 760.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the changing of VR operations are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A computer-implemented method for processing operations for providing spectator interactivity with virtual reality (VR) content presented by a head mounted display (HMD) of an HMD user, comprising:
   providing a VR scene to the HMD of the HMD user present in a real-world interactive space;
   sending a request to a client device of a spectator that is located in the real-world interactive space of the HMD user, the request being for spectator input, the client device configurable to generate one or more markers in response to the spectator input to be displayed on a display associated with the client device, the one or more markers are generated to encode a content of the spectator input such that differing content of the spectator input are encoded differently in the one or more markers, wherein the spectator and the HMD user are different and said spectator is not wearing an HMD;
   capturing, by one or more image capture devices, images of a real-world interactive space inclusive of the spectator, the images usable to detect the one or more markers being displayed on the display associated with the client device of the spectator and to decode the one or more markers into the content of the spectator input; and
   providing interactive input to the VR scene based on the one or more markers as detected and decoded, wherein the interactive input is configured to be integrated with the VR scene to augment at least part of the VR scene.

2. The computer-implemented method of claim 1, wherein the request includes audience participation content, the audience participation content configured to be displayed in a graphical user interface (GUI) on the display associated with the client device, the audience participation content configuring the spectator device to receive the spectator input.

3. The computer-implemented method of claim 2, wherein the audience participation content further configures the client device to receive a touch input from the spectator via the display associated with the client device of the spectator, the touch input being processed to at least partially be the spectator input to cause the augmenting of the VR scene, the augmenting including one or more of changing an appearance of content, changing progress of content, changing a state of content, providing interactive input for the HMD user, or a combination of two or more thereof.

4. The computer-implemented method of claim 2, wherein the audience participation content further configures the client device to receive an audio input from the spectator via the client device, the audio input being processed to at least partially be the spectator input.

5. The computer-implemented method of claim 1, wherein the one or more markers associated with the spectator input include a quick response (QR) code, a drawing, an audio sound, an image, a graphic, or a combination of two or more thereof.

6. The computer-implemented method of claim 1, wherein the spectator input includes one or more of a vote, a communication, a completion of a task, a donation, an input to a game action for the HMD user, a selection from the HMD user, a joint action made with the HMD user, or a combination of two or more thereof.

7. The computer-implemented method of claim 1, wherein the VR scene includes a VR game, a VR tour, a VR movie, a VR commercial, or a VR conference call or communication.

8. The computer-implemented method of claim 1, further comprising:
   executing a pairing process with the client device to enable the sending of the request to the client device, the pairing process including linking the client device with a computing device of the HMD, the linking enabling communication during a session of use of the HMD, wherein the pairing process is configured to enable linking with one or more additional client devices proximate to the HMD and said computing device of the HMD.

9. A computer-implemented method of enabling communication between a spectator and an HMD user, comprising:
   providing a VR scene to an HMD of the HMD user present in a real-world interactive space;

capturing, by one or more image capture devices, images of a real-world interactive space inclusive of the spectator, the images usable to detect a marker being displayed on a display of a device of the spectator, the device being configured for generating the marker in response to the spectator inputting a message at the device, said spectator is located in the real-world interactive space of the HMD user, wherein the spectator and the HMD user are different and said spectator is not wearing an HMD; and processing the marker for presenting the message along with the VR scene for enabling the HMD user to view the message, wherein the message is configured for augmenting at least part of the VR scene.

10. The computer-implemented method of claim 9, wherein said generating the marker includes encoding the message into the marker and wherein said processing the marker for providing the message includes decoding the message from the marker.

11. The computer-implemented method of claim 9, further comprising:

capturing, by the one or more images capture devices, additional images of the real-world interactive space inclusive of an additional spectator, the additional images usable to detect an additional marker being displayed on a display of an additional device of the additional spectator, the additional device is configured for generating the additional marker as a result of the additional spectator inputting a second message at the additional device; and processing the additional marker for presenting the second message along with the VR scene for enabling the HMD user to view the second message, wherein the second messenger is configured for further augmenting at least part of the VR scene.

12. The computer-implemented method of claim 9, wherein said augmenting at least part of the VR scene includes superimposing the message onto the VR scene or displaying the message in a secondary area outside of the VR scene.

13. The computer-implemented method of claim 9, wherein the marker includes a QR code and the device is configured to generate the QR code as a result of the spectator inputting the message at the device.

14. The computer-implemented method of claim 9, wherein said inputting the message at the device includes typing, speaking, or selecting a predefined message.

15. The computer-implemented method of claim 9, wherein said capturing images of the real-world interactive space occurs continuously such that the marker is detected automatically and the message is provided to the VR scene automatically.

16. A head-mounted display (HMD), comprising:

a display for providing a virtual reality (VR) scene to an HMD user present in a real-world interactive space;

one or more cameras for capturing images of a real-world space inclusive of a spectator, the images usable for detecting a marker of the spectator, the marker is configured to include a message, said spectator is located in the real-world interactive space of the HMD user, wherein the spectator and the HMD user are different and said spectator is not wearing an HMD; and a processor for processing the marker displaying the message along with presentation of the VR scene for enabling the HMD user to view the message.

17. The HMD of claim 16, wherein the one or more cameras are configured for continuously capturing the images of the real-world space such that the marker is detected automatically and the message is provided to the VR scene automatically.

18. The HMD of claim 16, wherein said displaying the message along with presentation of the VR scene includes superimposing the message onto the VR scene or displaying the message in a secondary area within the display outside of the VR scene.

19. The HMD of claim 16, wherein the processor is configured for processing the marker when the marker is raised by the spectator.

20. The HMD of claim 16, wherein the processor is configured for decoding the message from the marker, and wherein the marker includes a QR code, a barcode, a symbol, a text, an icon, a drawing, an image, an audio sound, or a graphic.

* * * * *